4 Sheets—Sheet 1.

A. U. SMITH.

AUTOMATIC COMPUTING SCALE.

No. 11,536. Reissued Apr. 28, 1896.

WITNESSES

W. A. Lamb.

S. V. Richardson.

INVENTOR

Albert U. Smith

By A. M. Wooster

Atty.

A. U. SMITH.

AUTOMATIC COMPUTING SCALE.

No. 11,536. Reissued Apr. 28, 1896.

WITNESSES

H. A. Lamb.

S. V. Richardson.

INVENTOR

Albert U. Smith

By A. M. Booster

Atty.

A. U. SMITH.

AUTOMATIC COMPUTING SCALE.

No. 11,536. Reissued Apr. 28, 1896.

WITNESSES

H. A. Lamb

S. V. Richardson

INVENTOR

Albert U. Smith

By A. M. Wooster Atty.

4 Sheets—Sheet 4.

A. U. SMITH.

AUTOMATIC COMPUTING SCALE.

No. 11,536. Reissued Apr. 28, 1896.

WITNESSES

H. A. Lamb

S. V. Richardson

INVENTOR

Albert U. Smith

By A. M. Wooster Atty.

UNITED STATES PATENT OFFICE.

ALBERT U. SMITH, OF SEYMOUR, CONNECTICUT, ASSIGNOR OF ONE-HALF TO EDMOND C. SMITH, OF WESTPORT, CONNECTICUT.

AUTOMATIC COMPUTING-SCALE.

SPECIFICATION forming part of Reissued Letters Patent No. 11,536, dated April 28, 1896.

Original No. 545,616, dated September 3, 1895. Application for reissue filed January 27, 1896. Serial No. 577,074.

*To all whom it may concern:*

Be it known that I, ALBERT U. SMITH, a citizen of the United States, residing at Seymour, in the county of New Haven and State of Connecticut, have invented certain new and useful Improvements in Automatic Computing-Scales; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in weighing-scales whereon the weight and selling-price of a commodity may be ascertained at a glance without any mental calculation on the part of the person using the same, but particularly resides in the details of construction and combination of elements, as will be fully hereinafter described, and specifically pointed out in the claims.

The object of my invention is to provide scales of this description which shall be extraordinarily sensitive to weights of small amount and to accurately register the same.

A further object of my invention is to provide an adjusting mechanism by the use of which the springs employed may at all times be held at a uniform tension, or, in other words, when said springs have become weakened or distorted by long usage the adjusting mechanism may be employed to restore a proper tension to said springs; also, said adjusting mechanism may be used to set the scales at a "balance" after the weighing-pan is suspended therefrom, and the difference in weight of various kinds of weighing-pans may be compensated for by the use of this mechanism.

Figure 1:
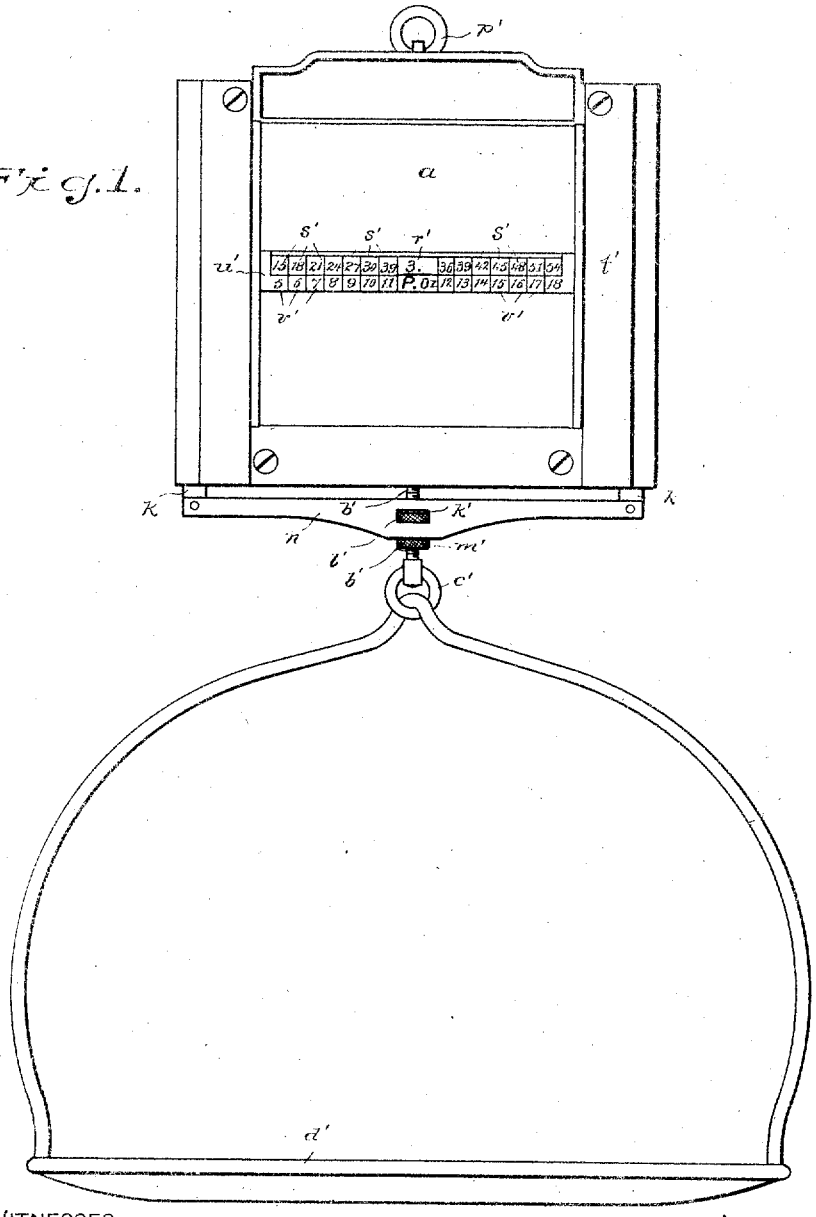
Figure 2:
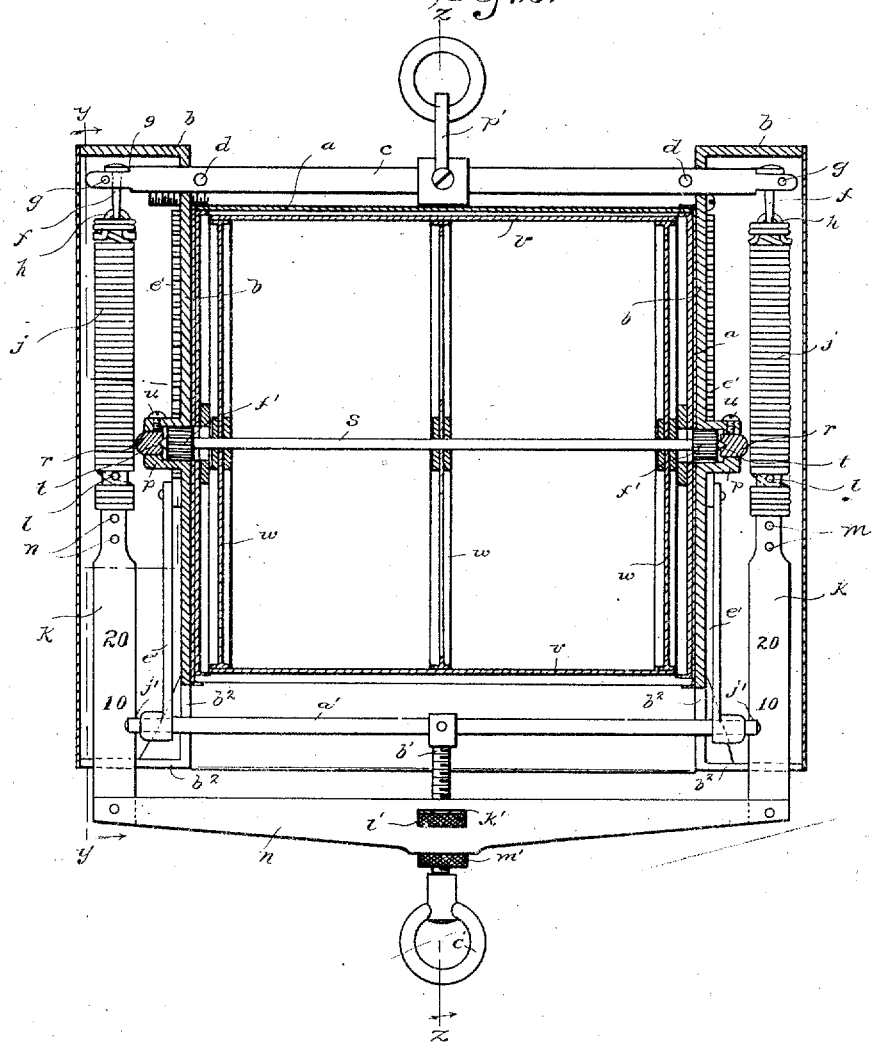
Figure 3:
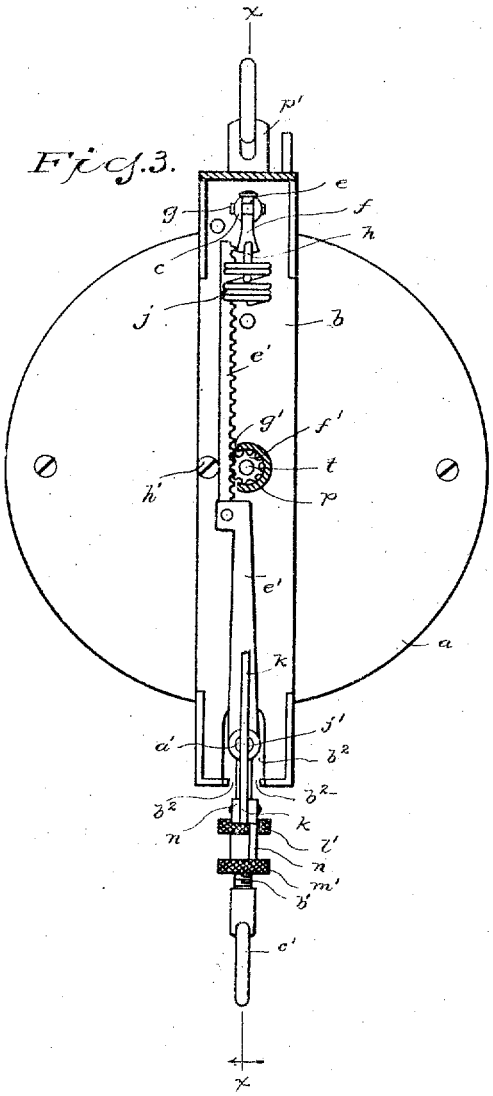
Figure 4:
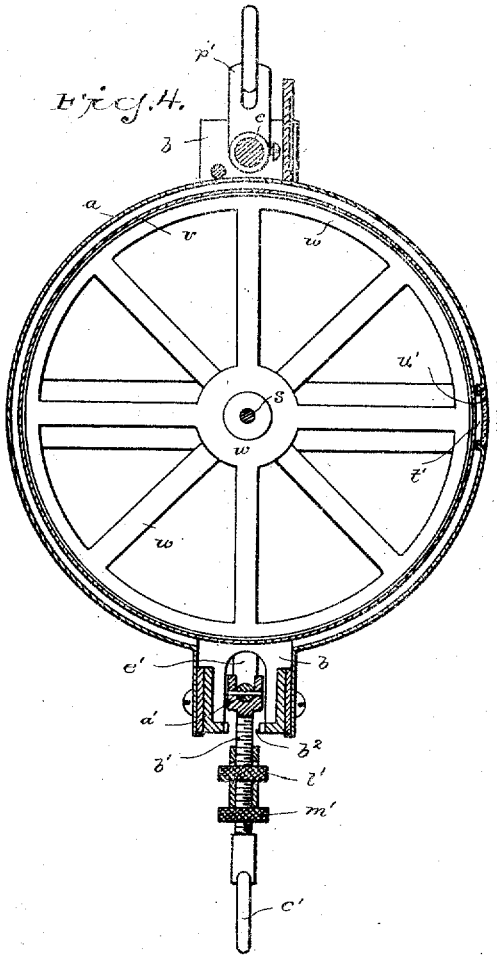

In the accompanying drawings, Figure 1 is a front elevation showing a weighing-pan suspended from the scales; Fig. 2, a section at the line $x\,x$ of Fig. 3; Fig. 3, a section on the line $y\,y$ of Fig. 2; Fig. 4, a section on the line $z\,z$ of Fig. 2, and Fig. 5 a detail elevation of the indicator-drum.

Similar letters of reference indicate like parts in the several figures of the drawings.

$a$ is the casing, on opposite sides of which are rigidly secured uprights $b$.

$c$ is a cross-bar loosely journaled in the uprights $b$ above the top of the casing, but held as against lengthwise movement by pins $d$, which pass through said bar. The ends of the cross-bar $c$ are notched, as shown at $e$ in Fig. 3, and the headed draft-pins $f$ are loosely held within these notches by keeper-pins $g$. The said draft-pins have secured loosely in their lower ends bow-shaped clips $h$, the ends of which are inserted between the coils of the springs $j$.

$k$ are draft-rods, the upper ends of which are connected to the lower coils of the springs $j$ by means of clips $l$, similar to the clips $h$, which are pivotally connected to the rods $k$ by simply inserting said clips through perforations $m$ in said rods. Each of the rods $k$ has a series of these perforations $m$, so that a greater or lesser length of spring may be used, as the exigencies of the case require. The lower ends of the draft-rods are pivotally connected by a yoke $n$.

$p$ are hollow bosses formed integral with the uprights $b$, within the outer extremities of which are adjustable bearings $r$ for the shaft $s$. The ends of the shaft $s$ are formed into cone-journals $t$, and the bearings $r$ for this shaft are correspondingly shaped. $u$ are set-screws for holding said bearings in place after a proper adjustment has been made.

$v$ is an indicator-drum which is rigidly secured to the shaft $s$. It is a very essential feature that the indicator-drum in scales of this nature should be made of very light material, for the reason that if it be not so made the sensitiveness and accuracy of the scales will be more or less affected. For instance, heretofore in scales of this character if a given quantity is weighed successively a number of times it will be found that said scales scarcely ever indicate the weight of such quantity twice exactly the same, there always being some slight variation in the amount registered. This is in a great measure due to the fact that the more the actual weight of the indicator-drum itself the greater must be the force necessary to operate it, and in order to overcome this disadvantage I have constructed the drum of thin skeleton frames $w$ of aluminium, while the periphery is formed of a thin sheet of paper pasted to the frames. In this way I have secured a structure that is so light that the force necessary to operate it is almost insignificant.

$a'$ is a cross-rod, to which is secured a screw $b'$. The screw $b'$ passes loosely through the yoke $n$, as shown at Fig. 4, and has within its lower end a ring $c'$, from which the scale-pan $d'$ is suspended.

Pivoted to the cross-bar $a'$ are rack-bars $e'$, which engage pinions $f'$, rigid with the shaft $s$. The hollow bosses $p$ are at one side slotted or cut away, as shown at $g'$ in Fig. 3, so that the rack-bars may be permitted to engage the pinions $f'$.

$h'$ are keepers (but one shown) which insure the engagement of the rack-bars and pinions.

The ends of the cross-rod $a'$ are notched, as shown at $j'$, and said ends embrace the edges of the draft-rods $k$ in such manner as to be capable of sliding thereon.

$k'$ is a slot in the yoke $n$, and within this slot is an adjusting-nut $l'$, which takes on the thread of the screw $b'$. $m'$ is a set-screw on the lower portion of said screw. By revolving the nut $l'$ the cross-rod $a'$, to which the screw $b'$ is connected, will be caused to move up or down, as the case may be, carrying with it the rack-bars $e'$, which will, through the pinions $f'$, effect the rotation of the indicator-drum as may be desired. Thus, should the scales when at rest indicate anything other than a perfect balance or zero, by turning the nuts $l'$ $m'$ the drum may be brought into proper relative position and there secured without disturbing the tension of the springs $j$. Should it be found necessary to increase or diminish the tension of the springs $j$, this may be easily effected by advancing the clips $h$ along the coils of said springs after the manner of advancing a nut along a screw-thread. The lower portions of the uprights $b$ are formed into guideways $b^2$, through which the ends of the cross-rod $a'$ and said draft-rods $k$ pass, so that said rods will be properly guided in their movements.

The cross-bar $c$ is provided with a ring-clip $p'$, by means of which the scales may be suspended from any suitable support.

Around the periphery of the drum $v$, at the central portion of the same, is a scale $r'$, (see Figs. 1 and 5,) indicating pounds and ounces.

$s'$ are columns of figures parallel with the scale $r'$ and arranged in alinement therewith, which indicate the total amount in money for which a commodity should be sold after it has been weighed.

$t'$ is an opening in the face of the casing $a$, within which is fitted a glass $u'$, through which may be seen the figures on the periphery of the drum. The glass $u'$ has printed or suitably inscribed thereon a series of figures $v'$, which register with the columns of figures $s'$ and indicate various prices per pound.

The central portion of the glass has marked thereon the abbreviations "P." and "Oz.," and the scale $r'$ on the periphery of the drum is adapted to register with these characters. Supposing that some article which weighs exactly three pounds has been placed in the weighing-pan of the scales, the indicator-drum will be brought to a position where the figure "3." in the column of pounds on the scale of the drum will be disclosed to view, as shown in Fig. 1. Supposing also that the price of such article is eight cents per pound, the operator will consult the series of figures on the glass until the number "8" is reached, when immediately above it will appear the total value of the article—*i. e.*, "24."

Figure 5:
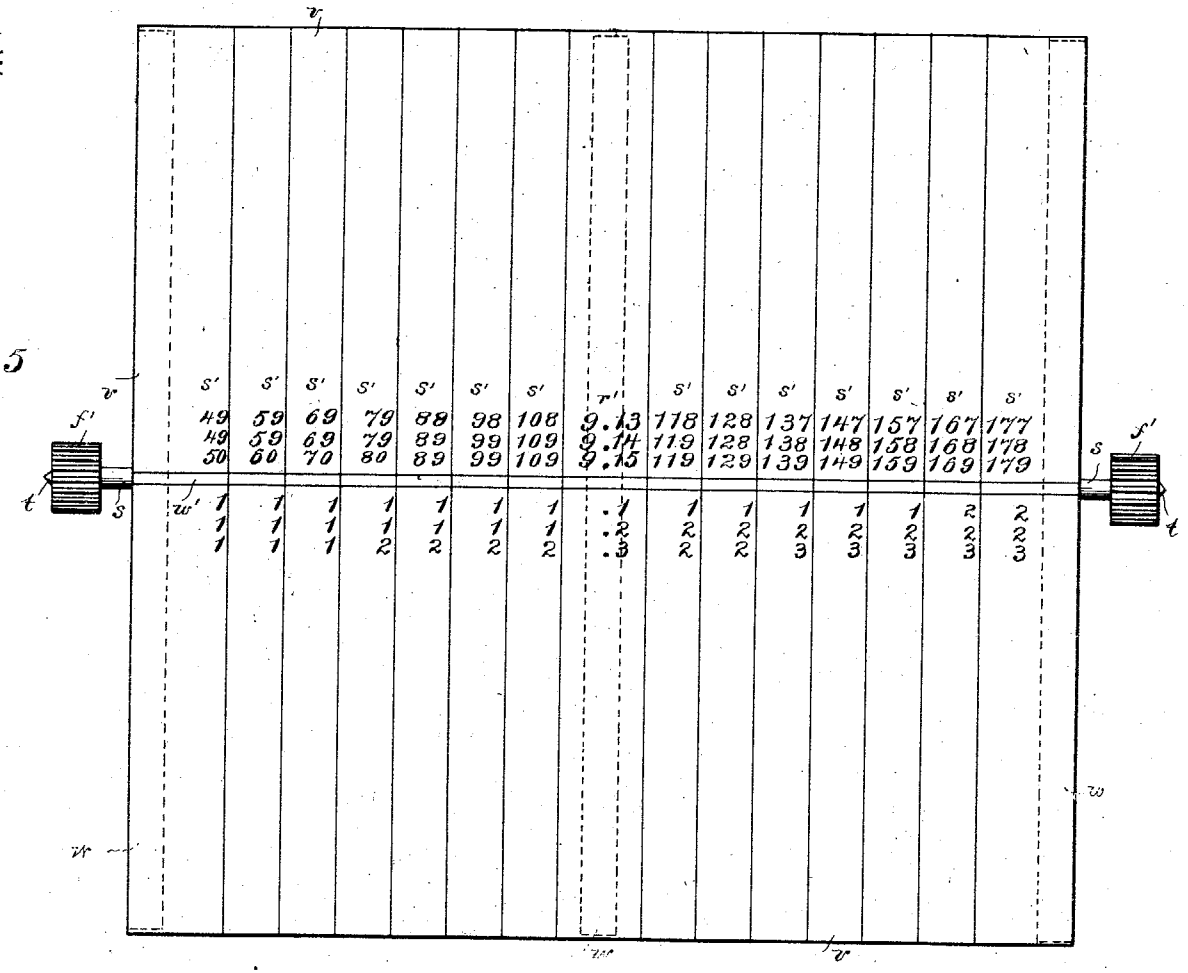

In Fig. 5 I have shown a detail view of the face of the drum, whereon the figures are inscribed, and the broad straight line $w'$ shown in this figure is intended to show through the glass $u'$ when the scales are at rest and at a balance or zero.

I am aware that computing-scales have heretofore been constructed wherein a drum or cylinder is employed having the divisions of the weight-scale and other figures on its periphery, whereby the total selling-price of an article may be determined without mental calculation on the part of the operator, and I am also aware that said drum has been operated by a rack-bar and pinion, and I therefore do not broadly make any claim to these features; but What I do claim, and desire to secure by Letters Patent, is—

1. The combination of the casing $a$ the uprights $b$ rigid with the sides thereof, the cross-bar $c$, the draft-rods $k$ connected at their lower ends by a yoke $n$, the springs interposed between said draft-rods and cross-bar in the manner specified, the indicator-drum journaled within the uprights and carrying pinions which are engaged by rack-bars, the cross-rod $a'$ to which the lower ends of the rack-bars are connected, the screw $b'$ depending from the cross-rod and passing through the yoke $n$, and the set-nuts on said screw, substantially as and for the purpose set forth.

2. The combination of the indicator-drum constructed of thin skeleton frames of a very light material, the periphery of said drum being formed of a sheet of paper having the divisions of the weight-scale and other numerals printed thereon, the pinions carried by the shaft of said drum, adjustable conical bearings wherein said shaft is journaled, the cross-bar $c$ having a suspending-clip secured thereon, the headed draft-pins supported loosely within the notched ends of the cross-bar $c$ after the manner of a stirrup connection, the bow-shaped clips in the ends of the draft-pins, the springs between the coils of which said clips are inserted, whereby the tension on said springs may be altered as described, the draft-rods $k$, the yoke $n$ whereby said rods are connected, the cross-rod $a'$ to which the rack-bars are pivoted and whose ends are notched and embrace said draft-rods so as to be capable of sliding thereon, a ring from which the scale-pan is suspended, and suitable adjusting connections between the yoke $n$ and said cross-rod $a'$, substantially as described.

3. The combination of the casing $a$, the uprights $b$ rigid with the sides thereof, the cross-bar $c$, the draft-rods $k$ connected at their lower ends by a yoke $n$, the springs interposed between said draft-rods and cross-bar, the indicator-drum journaled within the uprights and carrying pinions, the rack-bars engaging with said pinions, the cross-rod $a'$ to which the lower ends of the rack-bars are connected, and the pin $b'$ pivoted to said cross-rod and rigidly connected with the yoke $n$ as to vertical movement and provided with means whereby a scale-pan may be attached, substantially as set forth.

4. The combination of the cross-rod $a'$, the springs connected at their upper extremities to a stationary part of the scale, the draft-rods suspended from the lower extremities of said springs, the yoke connecting the lower ends of said draft-rods, the pin $b'$ pivoted to the cross-rod $a'$ and depending therefrom and provided at its lower extremity with means for attaching a scale-pan said pan being rigidly connected with the yoke $n$ as to vertical movement the otatory weight-indicating device, and means carried by the cross-rod $a'$ for operating said device, substantially as set forth.

5. An indicator-drum for weighing mechanism, consisting of a spindle provided with a plurality of skeleton frames of light material and secured to said spindle, and having secured to their peripheries a sheet of paper forming a cylinder.

6. An indicator-drum for weighing mechanism consisting of a spindle provided with a plurality of skeleton disks or frames of thin aluminium having a sheet of paper extending around and secured to their peripheries to form a cylinder.

7. The combination with balance-springs and a draft-rod of a weighing apparatus, of a rack operated by said rod, and an indicator-drum consisting of a spindle provided with a pinion engaging said rack, skeleton disks or frames of light material secured to said spindle and a sheet of paper extending around and secured to the peripheries of the disks to form a cylinder.

In testimony whereof I affix my signature in presence of two witnesses.

ALBERT U. SMITH.

Witnesses:
A. M. WOOSTER,
S. V. RICHARDSON.